Nov. 26, 1940.  R. A. GOEPFRICH  2,222,836
BRAKE
Filed Aug. 14, 1939  2 Sheets-Sheet 1

INVENTOR.
RUDOLPH A. GOEPFRICH
BY
M. W. McConkey
ATTORNEY.

Patented Nov. 26, 1940

2,222,836

UNITED STATES PATENT OFFICE 2,222,836

BRAKE

Rudolph A. Goepfrich, South Bend, Ind.

Application August 14, 1939, Serial No. 289,964

5 Claims. (Cl. 188—79.5)

This invention relates to brakes, and is illustrated as embodied in two types of internal expanding automobile brakes. Both illustrated brakes are of types in which the anchorage shifts in forward and reverse braking, so that the brake shoes are always fully effective.

An object of the invention is to provide simple and effective wear adjustments for brakes of such types, operated automatically to compensate for wear by means depending for its action on engagement with the brake drum, so that the adjustments are not affected by expansion of the drum when heated by prolonged braking.

A further object is to adapt such adjustments to brakes in which there are connected shoes anchoring on one shoe in forward braking and on the other shoe in reverse braking, as well as to brakes having shoes which shift individually to change the anchorage in forward and reverse braking.

Figure 1:
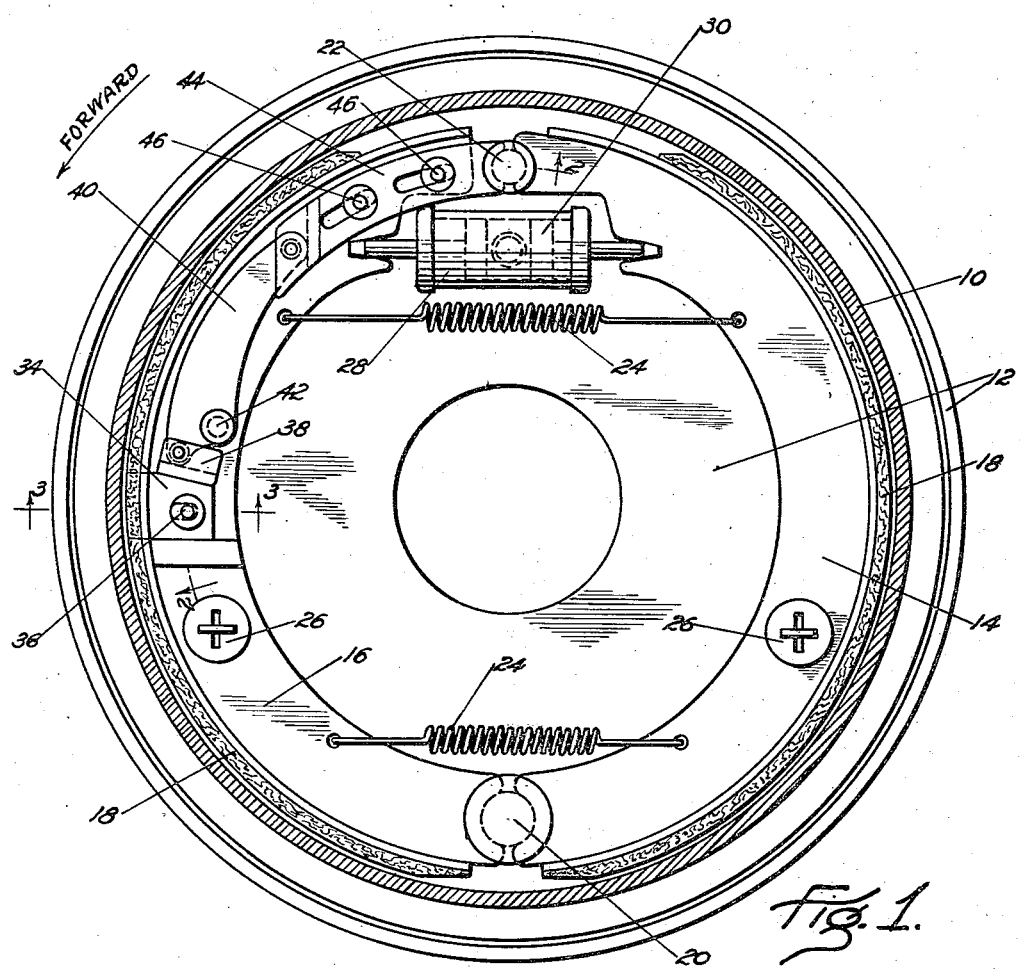
Figure 2:
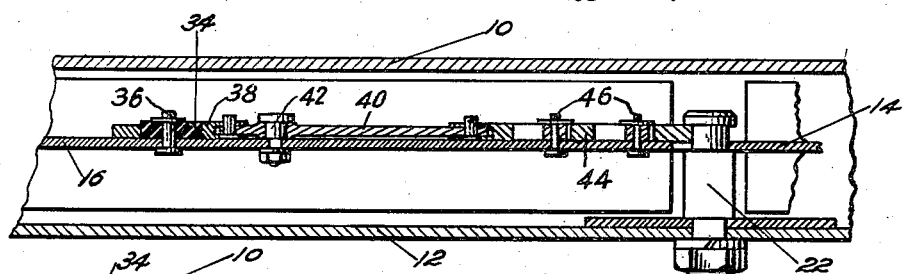
Figure 3:
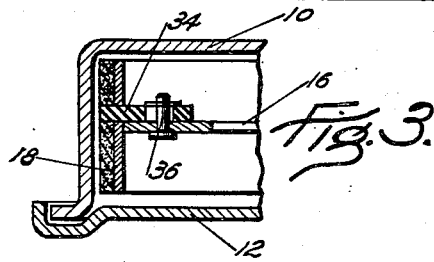

The above and other objects and features of the invention will be apparent from the following description of the illustrative embodiments shown in the accompanying drawings, in which:

Figure 1 is a vertical section through a brake having connected shoes, in a plane just inside the head of the brake drum, and showing the shoes in side elevation;

Figures 2 and 3 are partial sections on the lines 2—2 and 3—3 of Figure 1; and

Figure 4:
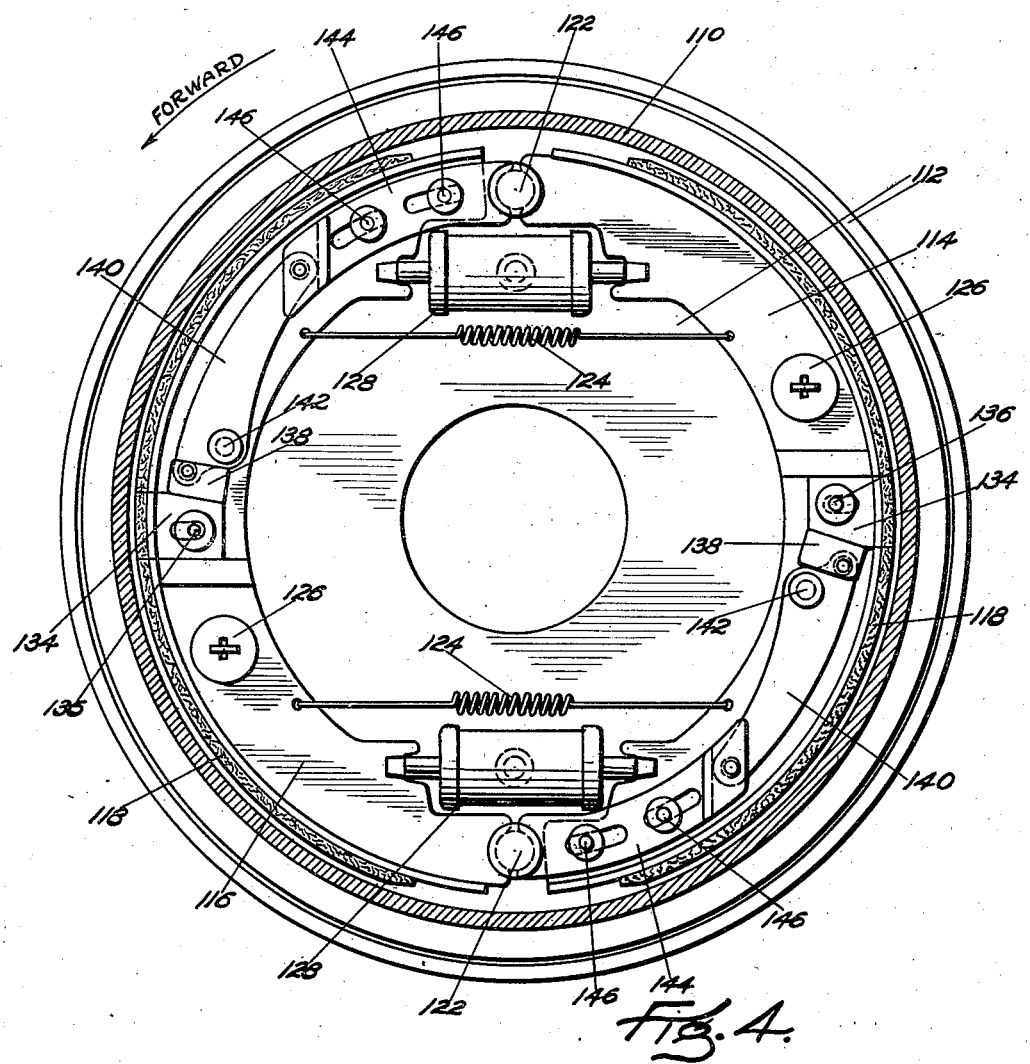

Figure 4 is a section corresponding to Figure 1, but showing a brake of the individually shiftable shoe type.

The brake shown in Figures 1-3 comprises a rotatable brake drum 10, at the open side of which is a suitable support or backing plate 12. The friction means of this brake comprises shoes 14 and 16, faced with brake lining 18 of any desired character. The shoes are connected at their lower ends by means such as a floating pivot 20.

The shoes embrace between their upper ends an anchor, such as a fixed post 22 mounted on the backing plate, shoe 14 anchoring thereon in forward braking (drum turning counterclockwise) and shoe 16 anchoring thereon in reverse braking (drum turning clockwise).

The shoes are forced apart to apply the brake, against the resistance of return springs 24, by applying means acting on the upper ends of the shoes. The shoes may have any desired steady rests 26. The particular brake illustrated is intended for use in a hydraulic braking system such as is now universally used in automotive vehicles, and in which the fluid in the system is under a light pressure even when the brakes are released. The device shown for applying the shoes consists of a wheel cylinder 28 in which are arranged pistons 30 having stems or piston rods engaging the upper ends of the webs of the brake shoes, the piston 30 for shoe 16 having a greater range of movement than the one for shoe 14, to compensate for the adjustment described below.

It will be noted that the pressure in the hydraulic system always holds the pistons out against the shoes, and consequently that the pistons in effect follow the shoes out to compensate for the adjustment of the anchorage means described below. The hydraulic system is supplied with the necessary additional fluid by the compensating action of the master cylinder, in the usual manner.

Mounted on the shoe 16 is an adjusting member 34, the outer end of which extends through and is guided by slots in the lining 18 and in the rim of the brake shoe, and which is flush at its end with the face of the lining 18 so that it engages the brake drum at the same time as the lining. The body of member 34 rests against the shoe web, and is formed with a guide slot embracing a pin 36 carried by the shoe web; the member 34 is held closely enough against the web so that the resulting friction prevents unintended shifting.

One edge of the member 34 is inclined to form a wedge which engages a thrust block 38 pivoted on one end of a lever 40. The lever 40 is pivoted on the shoe web at 42, and the long upper arm of the lever is pivoted to the lower end of an anchor-engaging part such as a slide 44 mounted on the side of the shoe web at its upper end. The slide 44 has guide slots embracing pins 46 carried by the shoe web. The end of the slide is formed with a semi-circular notch adapted to engage the anchor post 22.

In operation, after some wear of the lining has taken place, when the brake is next applied in forward braking the shoe 14 will be anchored on the anchor post 22 and the shoe 16 will move slightly counterclockwise away from the anchor post. As the shoe 16 is pressed against the drum by the pressure in cylinder 28, member 34 is pushed inwardly by the drum flush with the lining 18. Any movement of member 34 acts through the lever 40 to shift the slide 44 upwardly to compensate for whatever wear has taken place.

When the brake is next released, shoe 16 is stopped in a position nearer the drum than before (such as to give the same clearance with respect to the drum as before the lining had worn), by engagement of the slide 44 with the anchor 22. This leaves the corresponding piston 30 in a new idle position, since it is held by the pressure in the fluid system outwardly against the shoe web. It will be noted that the slide 44 is not under any load at the time it is adjusted by the member 34.

When reverse braking takes place, shoe 16 anchors on the post 22 through the slide 44. This imposes a heavy load on the slide, but backward movement of the slide on the shoe cannot take place since the reaction from the slide is taken on the member 34, which is at this time seated solidly against the brake drum.

In Figure 4 all parts corresponding to parts in Figures 1–3 are indicated by the same reference characters increased by 100. The two shoes 114 and 116 are in this case free to shift individually to anchor at their opposite ends on two anchors such as two posts 122 secured to the backing plate. The shoes are forced against the drums by the pressure in two interconnected wheel cylinders 128.

In this brake each shoe is provided with one of the above-described automatically adjusted anchor-engaging parts 144, arranged at the end of the shoe which anchors in reverse braking. The adjustments are each operated as described above in connection with Figures 1–3.

While two illustrative embodiments have been described in detail, it is not my intention to limit the scope of the invention to those particular embodiments, or otherwise than by the terms of the appended claims.

I claim:

1. A brake, for use in a hydraulic braking system containing fluid under pressure when the brakes are released, comprising, in combination with a brake drum and a backing plate at the open side of the drum, friction means carried by the backing plate, a hydraulic applying device acting on the friction means, an anchor adjacent the applying device, a part movably mounted on the friction means and which is engageable with said anchor, a member mounted on the friction means and which is constructed and arranged to be shifted generally radially of the brake by engagement with the drum as the friction means wears, and means operated by said member for adjusting the position of the anchor-engaging part gradually in the direction of the anchor to compensate for wear of the friction means.

2. A brake comprising, in combination with a brake drum and a backing plate at the open side of the drum, friction means carried by the backing plate and arranged to anchor at one end or the other according to the direction of drum rotation, a hydraulic applying device acting on the friction means, anchorage means for the friction means including an anchor adjacent the applying device, a part movably mounted on the end of the friction means which is unanchored in forward braking and anchored in reverse braking and which is engageable with said anchor when the brake is released (to position the friction means) and in reverse braking, a member mounted on the friction means and which is constructed and arranged to be shifted generally radially of the brake by engagement with the drum as the friction means wears, and means operated by said member for adjusting the position of the anchor-engaging part gradually in the direction of the anchor to compensate for wear of the friction means, said part being prevented from shifting backwards during reverse braking by said member which is at that time held in position by the brake drum.

3. A brake comprising, in combination with a brake drum, connected shoes both of which anchor through one shoe when the drum is turning in one direction and through the other shoe when the drum is turning in the other direction, a member mounted on one shoe for engagement with the drum and which is shifted inwardly on the shoe by the drum as the shoe wears, and anchor-engaging means mounted on the unconnected end of said one shoe constructed and arranged to be adjusted to compensate for wear of the shoes by the shifting of said member.

4. A brake comprising, in combination with a brake drum, a pair of shoes within the drum which are individually movable to anchor at either end independently of each other, applying means acting to force said shoes against the drum, a member mounted on each shoe for engagement with the drum and which is shifted inwardly on the shoe by the drum as the shoe wears, and anchor-engaging means for each of said shoes arranged to be adjusted by the shifting of the corresponding one of said members.

5. A brake shoe having mounted thereon a member adapted to be shifted crosswise of the shoe by engagement with a brake drum as the shoe wears, an anchor-engaging part mounted on the end of the shoe, and means operated by the shifting of said member to adjust said part to compensate for wear of the shoe by increasing its effective length.

RUDOLPH A. GOEPFRICH.